United States Patent
Ki et al.

(10) Patent No.: US 9,185,288 B2
(45) Date of Patent: Nov. 10, 2015

(54) APPARATUS AND METHOD FOR GENERATING AND CONSUMING THREE-DIMENSIONAL (3D) DATA FORMAT TO GENERATE REALISTIC PANORAMIC IMAGE

(71) Applicant: Electronics and Telecommunications Research Institute, Daejeon (KR)

(72) Inventors: Myung Seok Ki, Daejeon (KR); Yong Ju Cho, Seoul (KR); Seong Yong Lim, Daejeon (KR); Ji hun Cha, Daejeon (KR); Seung Kwon Beack, Seoul (KR); Yong Ju Lee, Daejeon (KR); Jin Woong Kim, Daejeon (KR); Seong Dae Kim, Daejeon (KR); Wook Joong Kim, Daejeon (KR); Ji Sung Yoo, Daejeon (KR); Sung Soo Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 318 days.

(21) Appl. No.: 13/800,119

(22) Filed: Mar. 13, 2013

(65) Prior Publication Data
US 2013/0250045 A1   Sep. 26, 2013

(30) Foreign Application Priority Data
Mar. 23, 2012  (KR) .................. 10-2012-0029962

(51) Int. Cl.
*H04N 5/232* (2006.01)
*H04N 13/00* (2006.01)

(52) U.S. Cl.
CPC ....... *H04N 5/23238* (2013.01); *H04N 13/0007* (2013.01); *H04N 13/0048* (2013.01)

(58) Field of Classification Search
None
See application file for complete search history.

(56) References Cited

U.S. PATENT DOCUMENTS

| 8,411,091 | B2 * | 4/2013 | Horri et al. ............. 345/427 |
| 2012/0105574 | A1 * | 5/2012 | Baker et al. ............. 348/36 |

FOREIGN PATENT DOCUMENTS

KR   1020110032402 A   3/2011

* cited by examiner

*Primary Examiner* — Dave Czekaj
*Assistant Examiner* — Nam Pham
(74) *Attorney, Agent, or Firm* — William Park & Associates Ltd.

(57) ABSTRACT

An apparatus and method for generating and consuming a three-dimensional (3D) data format to generate a realistic panoramic image are provided. The apparatus may include an image preprocessing unit to search for a matching point between images captured by a plurality of cameras, and to extract, as image information, at least one of a depth value, a texture value and object division information from each of the captured images, an image information structuring unit to structure 3D data to use the extracted image information to generate a realistic image, a 3D data format storage unit to store format information of the structured 3D data in a database (DB), realistic image generating unit to generate a realistic panoramic image using the stored format information of the 3D data, and a realistic image rendering unit to perform rendering on the generated realistic panoramic image.

10 Claims, 6 Drawing Sheets

FIG. 1

< Apparatus for generating and consuming 3D data format 100 >

APPARATUS AND METHOD FOR GENERATING AND CONSUMING THREE-DIMENSIONAL (3D) DATA FORMAT TO GENERATE REALISTIC PANORAMIC IMAGE

CROSS-REFERENCE TO RELATED APPLICATION

This application claims the benefit of Korean Patent Application No. 10-2012-0029962, filed on Mar. 23, 2012, in the Korean Intellectual Property Office, the disclosure of which is incorporated herein by reference.

BACKGROUND

1. Field of the Invention

The present invention relates to a method of structuring acquired multi-view images and three-dimensional (3D) information extracted using the acquired multi-view images in a single data format, to generate a realistic panoramic image that provides a realistic effect, such as a stereoscopic panoramic image or a free-view panoramic image, in addition to a simple panoramic image, by using images captured using a plurality of cameras, and relates to a method for freely generating various realistic panoramic images using the single data format.

2. Description of the Related Art

Panoramic images may be generated by capturing images using a plurality of cameras or a special optical lens and mirror and by synthesizing the images. Panoramic images have an advantage of providing a much wider viewing angle, compared to general image media.

However, due to a restriction on a capturing scheme, that is, a difficult capturing scheme, such as zooming in/out, focusing on a specific object and the like, generated panoramic images may easily become monotonous.

Currently, various realistic high-quality media, such as three-dimensional (3D) media, ultra high definition (UHD) media and the like, have appeared. In this situation, due to the above disadvantage of panoramic images, it may be difficult to provide users with great satisfaction by merely providing a wide viewing angle. Accordingly, in a panoramic image field, various panorama realistic technologies have been developed for years, for example a stereoscopic panorama technology, or a free-view panorama technology that provides a realistic effect by generating an image based on a change in a user's view through image modeling.

However, in a stereoscopic panorama image, a parallax error between images may occur due to a scheme of stitching each of a left image and a right image, similarly to a typical panoramic image. Accordingly, it is difficult to generate a perfect stereoscopic panoramic image.

Additionally, it is still difficult to apply, to actual services, a free-view panorama technology that is based on an image or that uses image modeling, due to complexity of the free-view panorama technology.

Actually, the above-described stereoscopic panorama technology and free-view panorama technology seem to be different from each other. However, in both the stereoscopic panorama technology and free-view panorama technology, depth values, texture information, image segmentation information of images and the like are required to be used for perfect realistic representation. However, since the above image information is currently extracted and modified suitable for a specific application, the image information may be restrictively used, and may be incompatible with each other.

For example, when pieces of image information acquired through multi-view images are structured, managed and combined, both a free-view panorama and a stereoscopic panorama may be freely implemented using a single data format. Additionally, a stereoscopic free-view panorama may also be enabled through combination of the free-view panorama and the stereoscopic panorama.

SUMMARY

According to an aspect of the present invention, there is provided an apparatus for generating and consuming a three-dimensional (3D) data format, including: an image preprocessing unit to search for a matching point between images captured by a plurality of cameras, and to extract, as image information, at least one of a depth value, a texture value and object division information from each of the captured images; an image information structuring unit to structure 3D data to use the extracted image information to generate a realistic image; a 3D data format storage unit to store format information of the structured 3D data in a database (DB); a realistic image generating unit to generate a realistic panoramic image using the stored format information of the 3D data; and a realistic image rendering unit to perform rendering on the generated realistic panoramic image.

According to another aspect of the present invention, there is provided a method of generating and consuming a 3D data format, including: searching for a matching point between images captured by a plurality of cameras, and extracting, as image information, at least one of a depth value, a texture value and object division information from each of the captured images; structuring 3D data to use the extracted image information to generate a realistic image; storing format information of the structured 3D data in a DB; generating a realistic panoramic image using the stored format information of the 3D data; and performing rendering on the generated realistic panoramic image.

EFFECT

According to embodiments of the present invention, an apparatus and method for forming a realistic panoramic image that may support both an advanced stereoscopic panorama image and an advanced free-view panoramic image that are used to solve a problem occurring during generation of a conventional stereoscopic panorama image by extracting data, for example depth values, texture information, object and area information, position information and the like of each of images captured using a plurality of cameras, by implementing the extracted data in a structured three-dimensional (3D) data format, and by combining and using the extracted data without a limitation to a specific application.

Additionally, according to embodiments of the present invention, it is possible to freely generate and combine a typical panoramic image, a stereoscopic panorama image, and a free-view panoramic image, by using a structured 3D data format.

Furthermore, according to embodiments of the present invention, it is possible to supplement a parallax error occurring in generation of a conventional stereoscopic panorama image, and a digital zoom function of a panoramic image.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
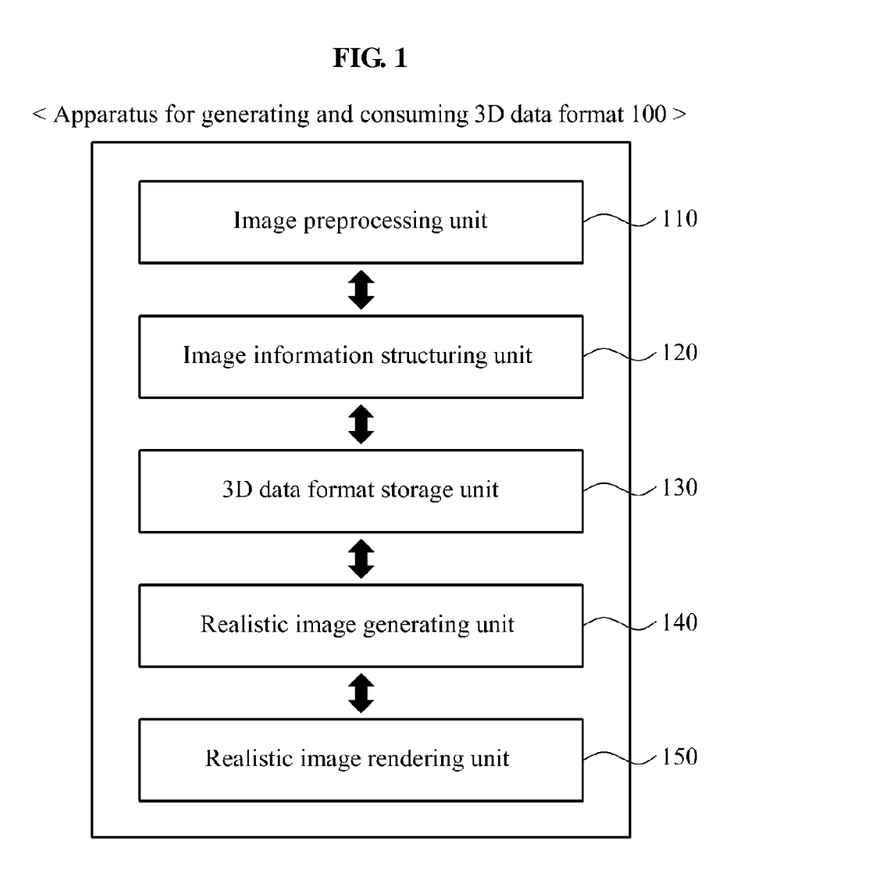
FIG. 1 is a block diagram illustrating an apparatus for generating and consuming a three-dimensional (3D) data format according to an embodiment of the present invention.

FIG. 1 is a block diagram illustrating an apparatus 100 for generating and consuming a three-dimensional (3D) data format according to an embodiment of the present invention.

The apparatus 100 of FIG. 1 may include an image preprocessing unit 110, an image information structuring unit 120, a 3D data format storage unit 130, a realistic image generating unit 140, and a realistic image rendering unit 150.

The image preprocessing unit 110 may search for a matching point between images captured by a plurality of cameras, and may extract, as image information, at least one of a depth value, a texture value and object division information from each of the captured images.

For example, the image preprocessing unit 110 may perform calibration, and may verify a 3D position relationship between of the plurality of cameras. Additionally, the image preprocessing unit 110 may search for the matching point between the captured images, based on the verified 3D position relationship.

The image information structuring unit 120 may structure 3D data to use the extracted image information to generate a realistic image.

The image information structuring unit 120 may divide at least one of an object and an area based on the depth value, and may wrap the at least one of the object and the area in a plurality of cylinders.

The image information structuring unit 120 may determine a number of cylinders, based on a level of the depth value, and a number of stages of each of the object and the area to be divided.

The 3D data format storage unit 130 may store format information of the structured 3D data in a database (DB).

The realistic image generating unit 140 may generate a realistic panoramic image using the stored format information of the 3D data.

In an example, the realistic image generating unit 140 may initialize each of layered cylinders corresponding to a left image and a right image, and may generate a layer cylinder.

When the layer cylinder is generated, the realistic image generating unit 140 may wrap an image in a layer matched to a depth value of a corresponding object, through image synthesis, using at least one of geometric position information, object and area division information and texture information of a multi-image stored in the DB, and may generate the realistic panoramic image.

In another example, the realistic image generating unit 140 may initialize each of layered cylinders corresponding to a left image and a right image, may generate a layer cylinder, may synthesize a panoramic image based on a basic view with a layer of each of generated cylinders, using a 3D data format of each of the captured images, may wrap an image in each of the generated cylinders, and may generate the realistic panoramic image.

The realistic image rendering unit 150 may perform rendering on the generated realistic panoramic image. For example, the realistic image rendering unit 150 may perform interpolation on an original image and a view transformation image, and may render the generated realistic panoramic image.

An example of structuring a plurality of images captured using a plurality of cameras in a 3D data format is described. Specifically, the image preprocessing unit 110 may verify a 3D position relationship between the plurality of cameras through a processing operation, such as calibration and the like, may recognize an object and an area in each of the images through image processing, and may extract a depth value and a texture value from each of the plurality of cameras.

Figure 2:
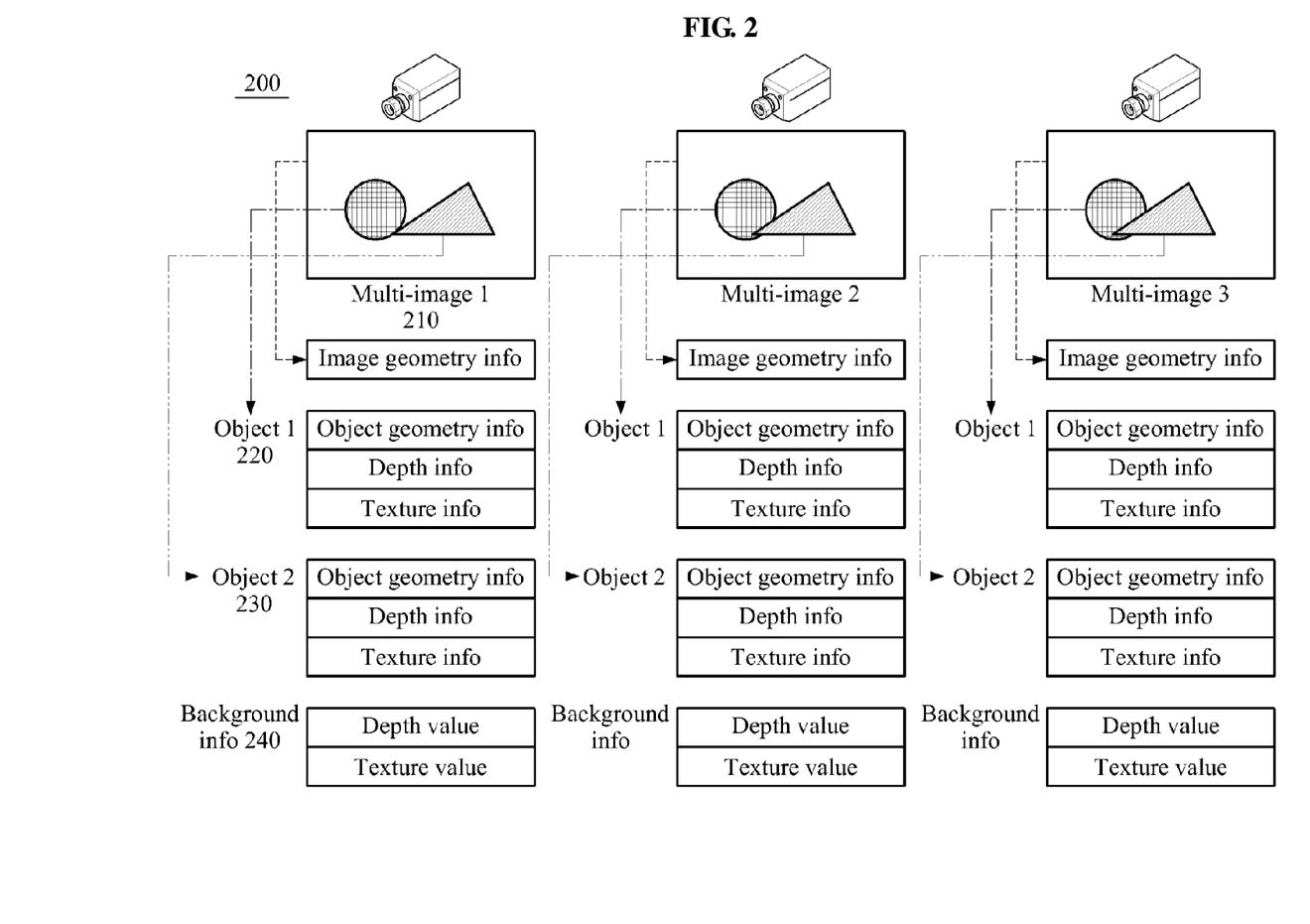
FIG. 2 is a diagram illustrating a structured 3D data format of a multi-view image according to an embodiment of the present invention.

In this instance, a depth value, a texture value, and other additional information that are extracted for each object or for each area may be stored in the 3D data format storage unit 130, in the same structure as shown in FIG. 2, through the image information structuring unit 120.

FIG. 2 is a diagram illustrating a structured 3D data format of a multi-image according to an embodiment of the present invention.

The image information structuring unit 120 of FIG. 1 may store, in the 3D data format storage unit 130 of FIG. 1, image geometry information, information of an object 1 220, information of an object 2 230, and background information 240 that form a multi-image 1 210.

Each of the information of the object 1 220 and the information of the object 2 230 may include object geometry information, depth information, and texture information.

An example of generating a realistic panoramic image using data structured as described above will be described below. For convenience of description of the present invention, a cylindrical shape may be provided as an example, however, there is no limitation to a specific wrapping shape.

Figure 3:
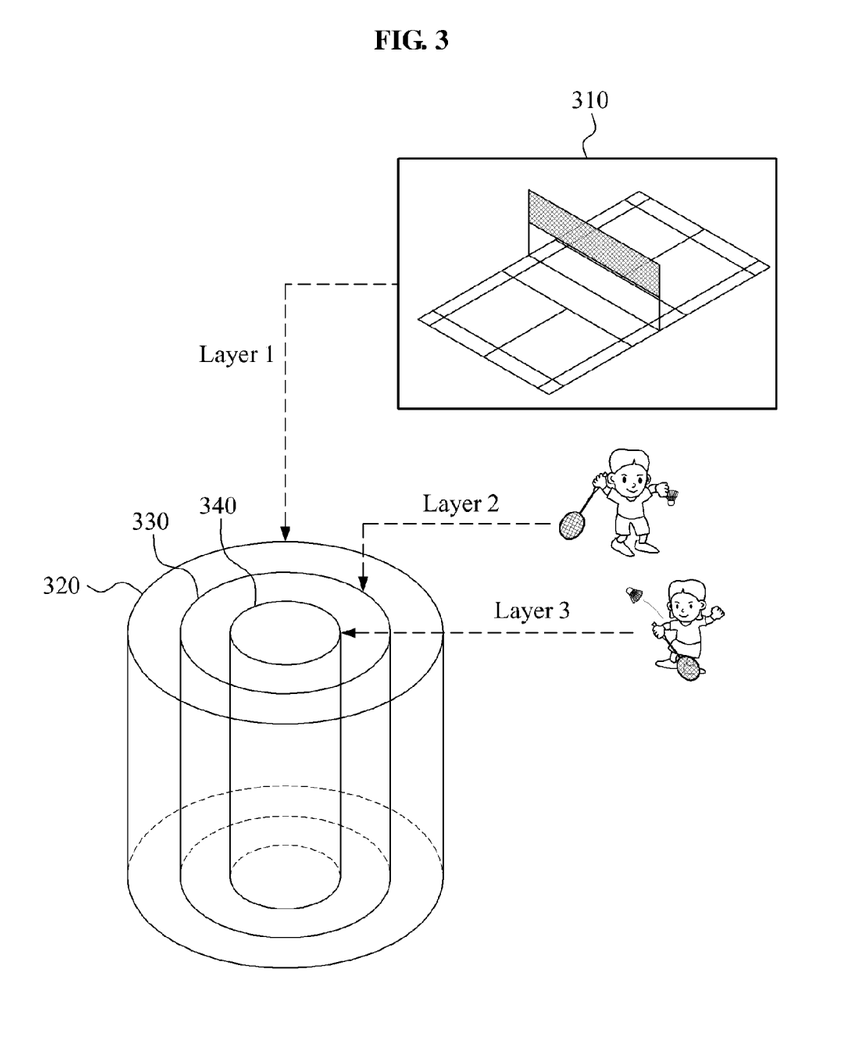
FIG. 3 is a diagram illustrating wrapping of a layer cylinder using a 3D data format according to an embodiment of the present invention.

FIG. 3 is a diagram illustrating wrapping of a layer cylinder using a 3D data format according to an embodiment of the present invention.

For example, when an image 310 captured using a plurality of cameras is implemented in the form of a cylindrical panorama, all image information may be wrapped in a single cylinder in a conventional panoramic image generation method.

However, in embodiments of the present invention, a realistic panoramic image may have a shape in which an object and an area are divided based on a depth value and the divided object and divided area are wrapped in cylinders 320, 330 and 340, as shown in FIG. 3.

In this instance, a number of cylinders may be determined based on a level of the depth value, and a number of stages of each of an object and an area a user desires to divide. For example, as shown in FIG. 3, three cylinders 320, 330 and 340 may be used for wrapping.

The above layer cylinder based on depth values may be used, instead of a single cylinder. Since the layer cylinder may be operated for each layer, the layer cylinder may be usefully used in processing of a stereoscopic realistic image, processing of a free-view realistic image, image zooming, and the like.

Figure 4:
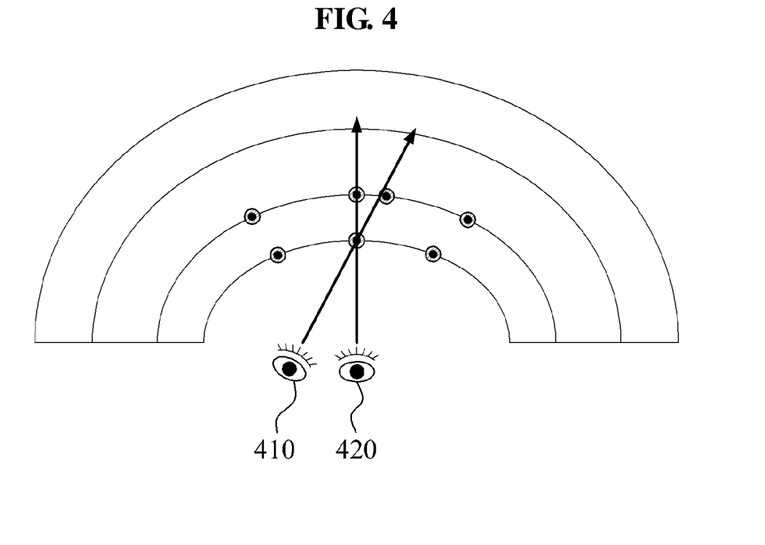
FIG. 4 is a diagram illustrating an image zoom interpolation using a 3D data format according to an embodiment of the present invention.

FIG. 4 is a diagram illustrating an image zoom interpolation using a 3D data format according to an embodiment of the present invention.

As described above, a current method of generating a stereoscopic panoramic image may employ a scheme of generating a stereoscopic panoramic image by rotating a structured camera rig system or a single camera and by synthesizing output images, or employ a scheme of acquiring a left image and a right image using a plurality of pairs of cameras including a pair of stereoscopic cameras, of stitching each of the acquired left image and the acquired right image, and of obtaining a left panoramic image and a right panoramic image.

However, since the scheme of generating a stereoscopic panoramic image by rotating a structured camera rig system or a single camera is inappropriate to be applied to moving images, there is a limitation to images. Additionally, when a scheme of generating a stereoscopic panoramic image using a plurality of stereoscopic cameras is used regardless of a geometrical shape of each of a left image and a right image, and a user's viewing viewpoint, a parallax error may occur, as described above.

Hereinafter, to solve the above problems, a method of generating a stereoscopic panoramic image using a depth value, a texture value and other additional information will be described.

To use a structured 3D data format extracted from a plurality of images, a realistic image generating unit may initialize each of layered cylinders corresponding to a left image and a right image that are to be generated.

In this instance, a number of layers of a cylinder may be determined, based on a level of an extracted depth value of an object or an area, or based on a user's selection. As the number of the layers increases, a realistic effect may increase, or an image may be more exquisitely generated. When a layer cylinder is generated, the realistic image generating unit may perform wrapping on a layer matched to a depth value of a corresponding object, through image synthesis, using geometric position information, object and area division information, and texture information of a multi-image stored in a 3D data format storage unit.

The stereoscopic panoramic image may be wrapped in a cylinder matched to a depth value of the stereoscopic panoramic image for each object, based on geometric position information and a focal length of an object or areas in an image, rather than all image information being mapped in a single cylinder. Thus, it is possible to solve a problem of a parallax error occurring in panorama stitching of a left image and a right image.

Additionally, when a user desires to adjust a disparity value of a stereoscopic panoramic image, the stereoscopic panoramic image may be freely modified, since the layer cylinder may be operated for each layer.

Hereinafter, an example of generating a free-view panoramic image using a structured 3D data format will be described.

Similarly to the above-described stereoscopic panoramic image, the realistic image generating unit may generate a layer cylinder based on information of an object unit and an area unit and a depth value of an analyzed multi-view image. Subsequently, the realistic image generating unit may synthesize a panoramic image based on a basic view with a layer of each of generated cylinders, using a 3D data format of each of multi-view images, and may wrap an image in each of the generated cylinders. During image synthesis, the realistic image generating unit may synthesize an image viewed when a position 410 of a user's gaze is changed to a position 420 as shown in FIG. 4, using a depth value, a texture value, position information and the like of a multi-view image, and may store the synthesized image. When the user's gaze is changed, a realistic image rendering unit may provide a user with a realistic effect through interpolation between an original image and a view transformation image.

Figure 5:
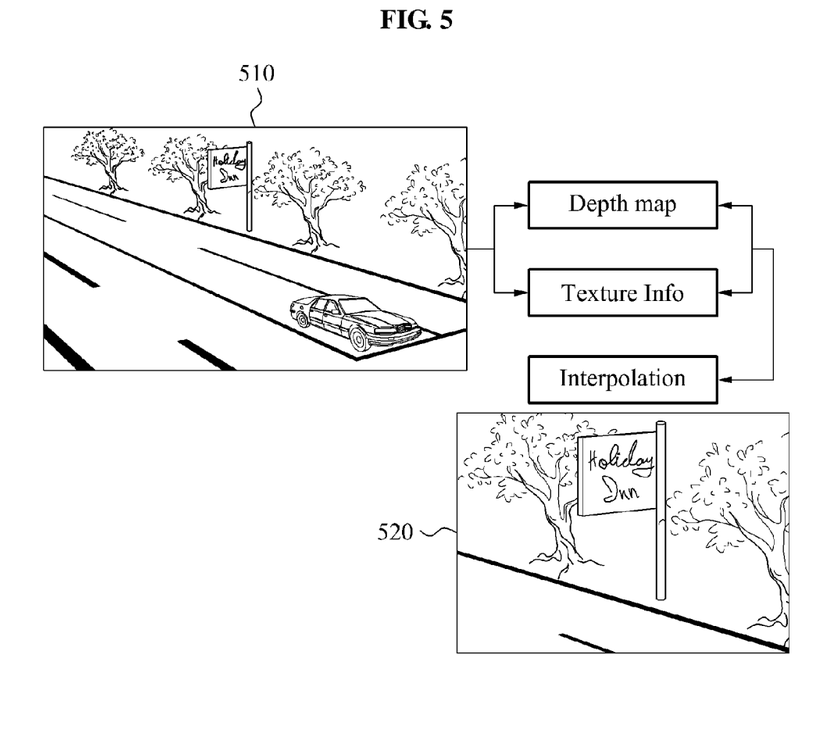
FIG. 5 is a diagram illustrating adaptive zooming using a 3D data format according to an embodiment of the present invention.

FIG. 5 is a diagram illustrating adaptive zooming using a 3D data format according to an embodiment of the present invention.

Conventionally, when a user zooms in or out a panoramic image, only simple digital enlargement and reduction may be enabled, and accordingly it may be difficult to overcome a reduction in an image quality. However, referring to FIG. 5, in an example in which a structured 3D data format is used, when a user tries to zoom in a panoramic image 510, the realistic image rendering unit may provide a zooming in/out function based on a shape of an object, through analysis of a texture and a depth value of an object in an image, instead of simple digital enlargement, by using a depth value (for example, a depth map), a texture value (for example, texture information) and object and area information that are stored, and may generate an enlarged image 520. Accordingly, it is possible to make up for a disadvantage of zooming in/out of the conventional panoramic image.

Figure 6:
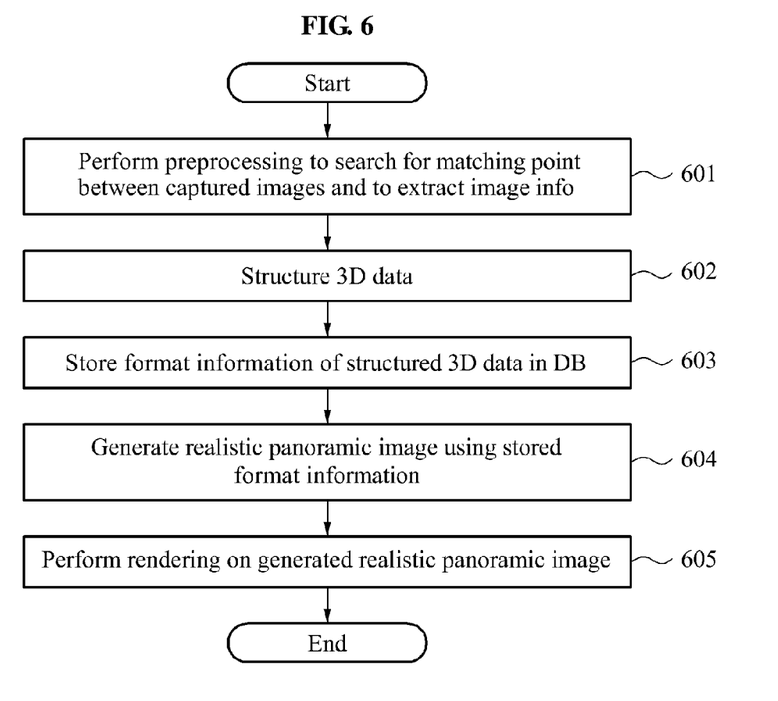
FIG. 6 is a flowchart illustrating a method of generating and consuming a 3D data format according to an embodiment of the present invention.

FIG. 6 is a flowchart illustrating a method of generating and consuming a 3D data format according to an embodiment of the present invention.

Referring to FIG. 6, in operation 601, a matching point between images captured by a plurality of cameras may be searched for, and at least one of a depth value, a texture value and object division information may be extracted, as image information, from each of the captured images.

In operation 602, 3D data may be structured to use the extracted image information to generate a realistic image.

In operation 603, format information of the structured 3D data may be stored in a DB.

In operation 604, a realistic panoramic image may be generated using the stored format information of the 3D data.

In operation 605, rendering may be performed on the generated realistic panoramic image.

The method of generating and consuming a 3D data format according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for generating and consuming a three-dimensional (3D) data format, the apparatus comprising:
    an image preprocessing unit to search for a matching point between images captured by a plurality of cameras, and to extract, as image information, at least a depth value from each of the captured images;
    an image information structuring unit to structure 3D data to use the extracted image information to generate a realistic image;
    a 3D data format storage unit to store format information of the structured 3D data in to a database (DB);
    a realistic image generating unit to generate a realistic panoramic image using the stored format information of the 3D data by identifying each of a plurality of layered cylinders corresponding to a left image and a right image to be generated, generating a layer cylinder by wrapping an image in a layer matched to the depth value of a corresponding object, through image synthesis, using at least one of geometric position information, object and area division information and texture information of a multi-image stored in the DB; and
    a realistic image rendering unit to perform rendering on the generated realistic panoramic image.

2. The apparatus of claim 1, wherein the image preprocessing unit performs calibration and verifies a 3D position relationship between the plurality of cameras prior to the searching, and thereafter searches for the matching point based on the verified 3D position relationship.

3. The apparatus of claim 1, wherein the image information structuring unit divides at least one of an object and an area based on the depth value, and wraps the at least one of the object and the area in a plurality of cylinders.

4. The apparatus of claim 3, wherein the image information structuring unit determines a number of the plurality of cylinders, based on a level of the depth value, and a number of stages of each of the object and the area to be divided.

5. The apparatus of claim 1, wherein the realistic image rendering unit performs interpolation on an original image and a view transformation image, and renders the generated realistic panoramic image.

6. The apparatus of claim 1, wherein the extracted image information further comprises at least one of a texture value and object division information.

7. A method of generating and consuming a three-dimensional (3D) data format, the method comprising:
    searching for a matching point between images captured by a plurality of cameras, and extracting, as image information, at least a depth value from each of the captured images;
    structuring 3D data to use the extracted image information to generate a realistic image;
    storing format information of the structured 3D data in a database (DB);
    generating a realistic panoramic image using the stored format information of the 3D data by:
        identifying each of a plurality of layered cylinders corresponding to a left image and a right image to be generated;
        generating a layer cylinder by wrapping an image in a layer matched to the depth value of a corresponding object, through image synthesis, using at least one of geometric position information, object and area division information and texture information of a multi-image stored in the DB; and
    performing rendering on the generated realistic panoramic image.

8. The method of claim 7, further comprising:
    prior to the searching for the matching point:
        performing calibration; and
        verifying a 3D position relationship between the plurality of cameras,
    wherein the searching comprises searching for the matching point based on the verified 3D position relationship.

9. The method of claim 7, wherein the extracted image information further comprises at least one of a texture value and object division information.

10. An apparatus for generating and consuming a three-dimensional (3D) data format, the apparatus comprising:
    an image preprocessing unit to search for a matching point between images captured by a plurality of cameras, and to extract, as image information, at least one of a depth value, a texture value and object division information from each of the captured images;
    an image information structuring unit to structure 3D data to use the extracted image information to generate a realistic image;
    a 3D data format storage unit to store format information of the structured 3D data in to a database (DB);
    a realistic image generating unit to generate a realistic panoramic image using the stored format information of the 3D data by identifying a plurality of layered cylinders corresponding to a left image and a right image to be generated, generating a layer cylinder, synthesizing a panoramic image based on a basic view with a layer of each of generated cylinders, using a 3D data format of each of the captured images, and wrapping an image in each of the generated cylinders; and
    a realistic image rendering unit to perform rendering on the generated realistic panoramic image.

* * * * *